United States Patent
Rangel et al.

(10) Patent No.: US 11,056,276 B2
(45) Date of Patent: Jul. 6, 2021

(54) INDUCTIVE POWER TRANSFER COIL AND METHOD FOR MAKING THE SAME FOR USE IN WIRELESS POWER TRANSFER SYSTEMS

(71) Applicant: Drayson Technologies (Europe) Limited, London (GB)

(72) Inventors: Manuel Pinuela Rangel, London (GB); Gonzalo De Gisbert, London (GB); Alessandro Revelant, London (GB); James Lawson, London (GB); Paul David Mitcheson, London (GB); David Christopher Yates, London (GB)

(73) Assignee: DRAYSON TECHNOLOGIES (EUROPE) LIMITED, London (GB)

( * ) Notice: Subject to any disclaimer, the term of this patent is extended or adjusted under 35 U.S.C. 154(b) by 95 days.

(21) Appl. No.: 16/333,628

(22) PCT Filed: Sep. 18, 2017

(86) PCT No.: PCT/GB2017/052771
§ 371 (c)(1),
(2) Date: Mar. 15, 2019

(87) PCT Pub. No.: WO2018/051137
PCT Pub. Date: Mar. 22, 2018

(65) Prior Publication Data
US 2019/0221364 A1     Jul. 18, 2019

(30) Foreign Application Priority Data

Sep. 16, 2016 (GB) ..................... 1615852

(51) Int. Cl.
*B82Y 99/00* (2011.01)
*H02J 17/00* (2006.01)
*H01F 38/14* (2006.01)
*H01F 41/04* (2006.01)
*H02J 50/10* (2016.01)

(52) U.S. Cl.
CPC ............. *H01F 38/14* (2013.01); *H01F 41/04* (2013.01); *H02J 50/10* (2016.02)

(58) Field of Classification Search
CPC .......... H01F 41/04; H01F 38/14; H02J 50/10
See application file for complete search history.

(56) References Cited

U.S. PATENT DOCUMENTS

| 2001/0033175 A1 | 10/2001 | Marbach |
| 2005/0156703 A1 | 7/2005 | Twaalfhoven |

(Continued)

FOREIGN PATENT DOCUMENTS

| CN | 203165495 U | 8/2013 |
| DE | 10 2013 112325 A1 | 5/2015 |

(Continued)

OTHER PUBLICATIONS

GB Examination Report dated Jan. 28, 2020 for corresponding GB Application No. 1615852.9.

(Continued)

*Primary Examiner* — Jared Fureman
*Assistant Examiner* — Esayas G Yeshaw
(74) *Attorney, Agent, or Firm* — Tarolli, Sundheim, Covell & Tummino LLP (57) ABSTRACT

An inductive power transfer coil and method for making the same for use in wireless power transfer systems. The inductive power transfer coil comprising an elongate member disposed around a looped path, wherein the elongate member is arranged in a helical form and the axis of the helical form is provided by the looped path so that the coil scaffold defines a toroidal void and each circuit of the looped path provides a coil turn. The elongate member is covered by a conductive layer to provide a coiled conductive tube.

17 Claims, 4 Drawing Sheets

(56) References Cited

U.S. PATENT DOCUMENTS

| | | | | |
|---|---|---|---|---|
| 2011/0049997 A1* | 3/2011 | Urano | ............... | H02J 5/005 |
| | | | | 307/104 |
| 2012/0104999 A1* | 5/2012 | Teggatz | ............ | H02J 7/00034 |
| | | | | 320/108 |
| 2013/0020877 A1* | 1/2013 | Miller | ............... | H02J 7/00036 |
| | | | | 307/104 |
| 2014/0246922 A1* | 9/2014 | Ichikawa | ............... | H01F 38/14 |
| | | | | 307/104 |
| 2014/0375411 A1* | 12/2014 | Scholz | ............... | H01F 27/323 |
| | | | | 336/200 |
| 2015/0102685 A1* | 4/2015 | Blood | ............... | B60L 53/36 |
| | | | | 307/104 |
| 2017/0005519 A1* | 1/2017 | Lee | ............... | H01F 27/006 |

FOREIGN PATENT DOCUMENTS

| | | | |
|---|---|---|---|
| EP | 3 038 118 A1 | 6/2016 | |
| WO | 2007142099 A1 | 5/2007 | |
| WO | 2010127409 A2 | 11/2010 | |
| WO | 2016036854 A1 | 3/2016 | |

OTHER PUBLICATIONS

Vortex Resonance Coil Mini VRC: Over Unity Measurement using 2×3 Meters and one Scope, YouTube, Jun. 25, 2013, by Vortex Resonance Coil, link below https://www.bing.com/videos/search?q=vortex+coils&qs=n&sp=-1&pg=vortex+coils&sc=8-2&sk=&cvid=DB042EF3EB474F7ABSF6F025728E60828&ru=%2fsearch%3 fq%3d vortex%2520coils%26qs%3dn%26form%3dQBVDMII%26sp%3d-1%26pg%3dvortcx%2520coils%26sc%3d8-12%26sk%3d% 26evid%.

Rodin Coil video, Aug. 31, 2013, link below https://www.bing.com/video/search?q~Rodin+Coil+3D&ru=%2fvideos%2 fsearch%3fq%3dRodin%2bCoil%2b3D%26FORM%3dVRIBIP&view=detail&mid=02F07E5E00884F9E8IE502F07E5E00884F9E8IES&&FORM=VDRVRV.

GB Examination Report dated Aug. 30, 2019 for corresponding GB Application No. 1615852.9.

International Search Report and Written Opinion dated Jan. 23, 2018 for corresponding International Application No. PCT/GB2017/052771.

UK Search and Examination Report dated Oct. 7, 2016 for corresponding GB Application No. 1615852.9.

S. H. Lee et al, "Development and validation of model for 95%-efficiency 220-W wireless power transfer over a 30-cm air gap", IEEE Transactions on Industry Applications, vol. 47, No. 6, 2011, pp. 2495-2504.

S. H. Lee et al, "Surface spiral coil methodologies for high efficiency, high power, low flux density, large air-gap wireless power transfer systems", Twenty-Eighth Annual IEEE Applied Power Electronics Conference and Exposition, 2013, pp. 1783-1790.

* cited by examiner

INDUCTIVE POWER TRANSFER COIL AND METHOD FOR MAKING THE SAME FOR USE IN WIRELESS POWER TRANSFER SYSTEMS

TECHNICAL FIELD

The present disclosure relates to inductive power transfer systems for wireless transfer of electrical power, and to inductive power transfer coils and methods for their manufacture, still more particularly it relates to non-contact wireless transfer of electrical power for the transfer of electrical power between separate devices.

BACKGROUND

The problem of how to communicate electrical energy from a power source to a load is ubiquitous. Cables are the most commonly used solution.

However, attempts have been made for many years to find an efficient means of wireless power transfer. This is of particular importance in many applications because the act of plugging and unplugging power supply cable connectors can be inconvenient and hazardous.

For example, in hybrid and electrical vehicles the power cable may represent a problem from the point of view of reliability and maintenance performance and also from the point of view of user safety and convenience. Power cables are subject to mechanical deterioration caused by outdoor environments and repeated use. In view of the relatively high power required to charge such vehicles rapidly, deterioration of the cable may represent a hazard, and drivers may be unwilling or unable to manually plug and unplug the connectors to charge the vehicle.

These issues are of course not specific to hybrid vehicles, and have been recognised for many years in other contexts. As a result many inventors in large and well-funded research organisations and commercial entities have been searching for a solution for many decades.

In short—high power rating, high efficiency, wireless power transfer is a very important technology. It is still more important if transfer over air-gaps greater than about ten centimetres can be achieved.

Complex wire coil structures have been proposed to achieve these high efficiencies, amongst them is the so-called surface spiral.

These and other structures must be wound onto formers, typically formed from a dielectric of some kind. As a result dielectric losses become a problem and a result of the complex winding patterns is that large potential differences may exist between conductors in close proximity. Conductive and proximity effect losses can lower the Q factor of such coils.

SUMMARY OF INVENTION

Aspects and embodiments of the present invention are set out in the claims. These and other contributions of the present disclosure aim to address the above described technical problem, and others mentioned below.

In particular, the inventors in the present case have been working on a new kind of inductive power transfer (IPT) coil for nearly five years.

They initially proposed, and disclose herein for the first time, an inductive power transfer coil comprising a self-supporting elongate tubular conductor arranged in a toroidal helix—in other words a helical form in which the 'axis' of the helix is provided by a looped path, such as a circle or an ellipse. A helical form like this defines a toroidal void inside the helix which contains the looped path. It is necessary at this point briefly to explain some terminology, in this structure each circuit of the looped path by the coil is referred to as a coil turn. Each complete twist ($2\pi$ rotation) of the helix about that path is referred to as a helical turn.

In embodiments of the disclosure, the pitch of the helix is chosen in relation to the length of the looped path so that each coil turn comprises less than one helix turn. The coil may include a number of coil turns selected so that the coil comprises an integer number of helix turns.

Having invented this structure, and having then verified by the use of mathematical modelling the advantages they thought it should provide, the inventors made many attempts to construct a prototype of their coil. For example, cables comprising a plurality of braided conductors were formed into the desired shape, and as another alternative single core copper wire was bent into this shape.

Whilst these prototypes did indeed satisfactorily address the problem of wireless power transfer, the inventors identified a stark shortfall in efficiency between their predictions and the actual performance of the structures that they had built. Whilst their mathematical models promised remarkably high efficiency they were unable to achieve this exceptionally high efficiency in practice. This problem persisted for many years (at least from 2012 until 2016) and despite careful and diligent research has only now been solved.

The present application now discloses a method of manufacturing an inductive power transfer (IPT) coil, the method comprising: providing a coil scaffold comprising an elongate member arranged to provide at least a first coil turn and a second coil turn, wherein the first coil turn and the second coil turn are non-coplanar with each other and wherein the first coil turn is at least partially surrounded by the second coil turn; providing a conductive layer which conforms to and covers the surface of the elongate member to provide a conductive tube which follows the form of the scaffold to provide the coil; wherein the coil scaffold supports the conductive tube so that there is a spacing between coil turns.

The elongate member may be disposed around and spaced from a looped path. Thus, when the elongate member is arranged in a helical form about this looped path (e.g. the axis of the helical form is provided by the looped path) it provides a toroidal helix.

The pitch of this helical form is chosen so that each coil turn comprises less than one complete helix turn, thereby to provide a plurality of non-coplanar coil turns.

The coil may have an even number of coil turns, and the pitch of the helical form may be chosen so that the coil comprises an integer number of helical turns.

The conductive layer may be formed in situ on the scaffold, for example it may be deposited onto the scaffold. The conductive layer may be continuous and unbroken around the coil turns. The conductive layer may completely cover the coil turns.

Such coils may be made using additive manufacture processes. For example the scaffold may be 3D-printed, and then covered (for example coated or plated) with the conductive layer.

These and other embodiments of the disclosure can provide an inductive power transfer (IPT) coil comprising a coil scaffold comprising an elongate member disposed around and spaced from a looped path, wherein the elongate member is arranged in a helical form and the axis of the helical form is provided by the looped path so that the coil scaffold defines a toroidal void which contains the looped path, wherein each circuit of the looped path provides a coil turn; a conductive layer which conforms to and covers the surface of the elongate member to provide a coiled conductive tube.

The coil scaffold may support the conductive layer so that, along the coil turns, there is an even spacing between the surface of the conductive layer of adjacent coil turns. For example, the spacing between the external surface of the conductive layer on adjacent coil turns may be even. For example, the distance of closest approach between nearest coil turns may be uniform throughout the coil. It will be appreciated in the context of the present disclosure that the distance of closest approach between nearest coil turns may be defined as the distance between the external surface of the conductive layer on one coil turn and the external surface of the conductive layer on the closest coil turn.

As noted above, the pitch of the helical form is generally chosen so that each coil turn includes less than one complete helix turn of the helical form. The coil may have an even number of coil turns, and the pitch of the helical form may be chosen so that the coil comprises a number of helical turns, for example an integer number of helical turns.

Typically the scaffold comprises a first material, and the conductive layer comprises a second material different from the first material. In some embodiments however the same material may be used for both the scaffold and the conductive layer. In such cases a separate coating or covering step may not be needed.

BRIEF DESCRIPTION OF DRAWINGS

Embodiments of the disclosure are described herein, by way of example only, with reference to the accompanying drawings, in which.

In the drawings like reference numerals are used to indicate like elements.

SPECIFIC DESCRIPTION

Figure 1:
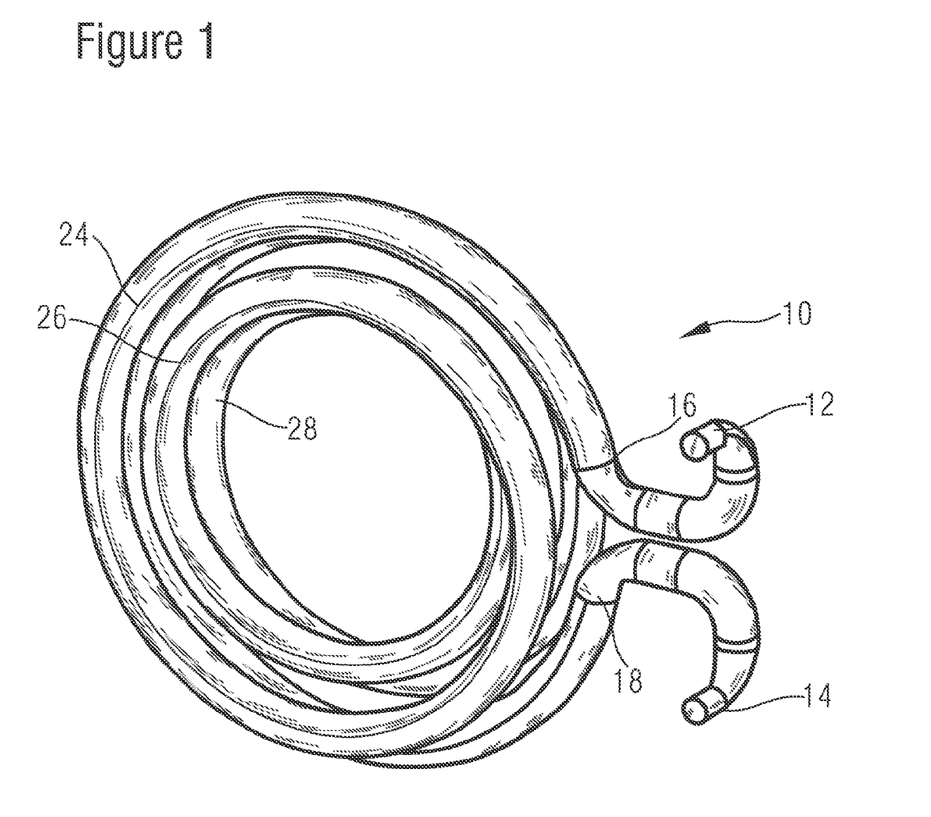
FIG. 1 shows an elevation view of an inductive power transfer coil.
Figure 2:
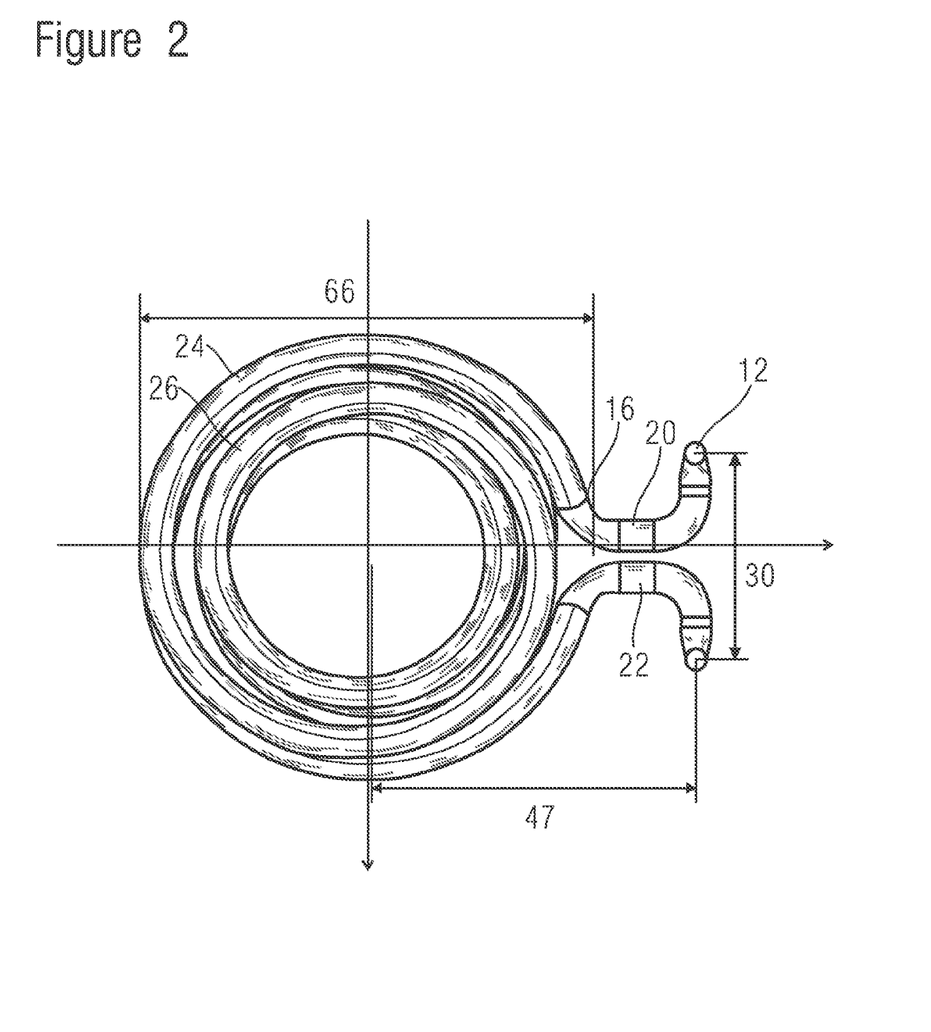
FIG. 2 shows a plan view of the inductive power transfer coil illustrated in FIG. 1.
Figure 3:
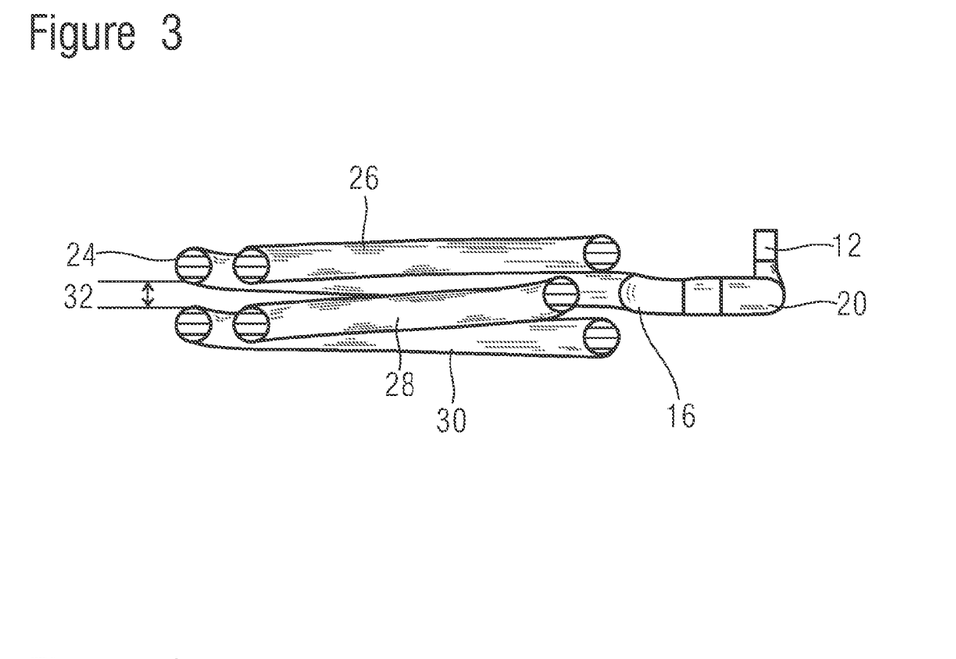
FIG. 3 shows a first section through the inductive power transfer coil illustrated in FIG. 1.
Figure 4:
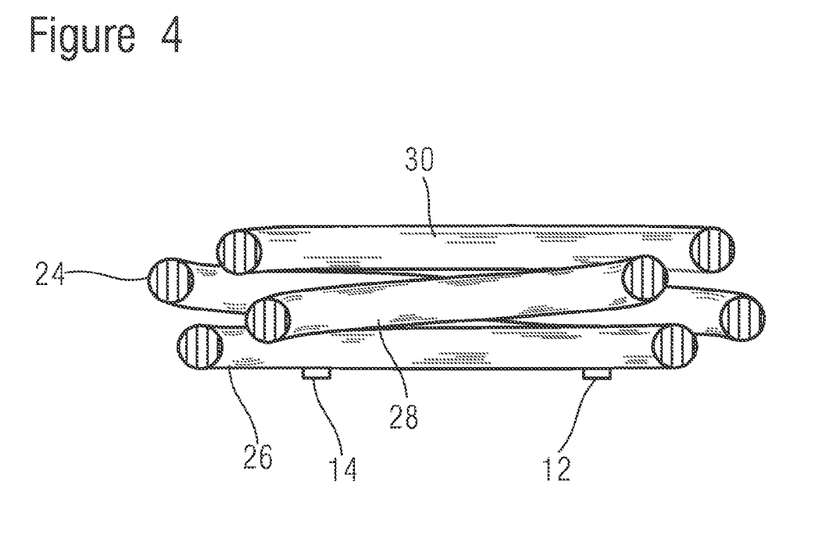
FIG. 4 shows a second section through the inductive power transfer coil illustrated in FIG. 1.

FIG. 1 illustrates an inductive power transfer (IPT) coil. FIG. 2 shows a plan view of the same IPT coil 10. In the plan view, X and Y axes of a Cartesian coordinate system are indicated for ease of reference. The origin of this coordinate system is centred on the centre of the coil. The Z axis is not shown but extends in the through-page direction. FIG. 3 illustrates a section view of the IPT coil of FIG. 1, wherein the section is taken along the Y-axis. FIG. 4 illustrates a section view of the IPT coil of FIG. 1, wherein the section is taken along the X-axis. Because of the three-dimensional nature of the structure some elements are hidden from view in some of these four drawings.

This IPT coil 10 comprises a continuous elongate member arranged in a series of coil turns 24, 26, 28, 30 between the two ends, 16, 18 of the coil 10. Each of the two ends 16, 18 of the coil lie in the same Z-plane (z=0). The first end 16 is joined to a first connection pin 12 by a first portion 20 of the elongate member which is C-shaped when viewed in plan.

The second end 18 of the coil is joined to a second connection pin 14 by a second portion 22 of the elongate member which is a mirror image of the first (C-shaped) portion when viewed in plan.

Each coil turn 24, 26, 28, 30 comprises a curved portion of the elongate member in which it turns through a complete circle. When viewed in plan, as in FIG. 2, it can be seen that the start of each coil is radially offset from its end (and, of course by definition, also from the start of the next). However this radial offset is not constant, it may reduce in magnitude along the length of the coil, from one turn to the next, and then change in sign and increase in magnitude in each successive turn. As a result, the turns of the coil 24, 26, 28, 30 spiral radially inward when viewed in plan, and then radially outward again. In addition, the start and end of each coil turn may be offset from each other in the Z direction, and the Z-offset between the start and end of each coil turn 24, 26, 28, 30 may also vary in magnitude and change sign along the length of the coil. This can enable the first coil turn and the last coil turn to have the same radius of curvature. It may also enable the two ends of the coil 16, 18 to lie in the same Z-plane (z=0). This progressive change in radial offset and Z-offset between the start and end of the coil turns means that, typically, any two successive coil turns will be non-coplanar with each other and one will be at least partially surrounded by the other. This general structure has been found to be an advantageous way to provide coil turns with an even spacing between them (e.g. uniform along the length of the coil turns). For example, it may permit a large number of turns to be provided in a constrained volume whilst increasing the size of the (even) spacing between those coils.

The elongate member can be 3D-printed in this formation using a process such as selective laser sintering (SLS), in some examples ABS Plastic is 3D printed using a Polyjet process. In such examples layers of curable liquid photopolymer are deposited onto a build tray in the desired form and cured using UV light. This and other processes may be used to provide a scaffold structure having surfaces at positions which can be accurately defined relative to each other in a 3D coordinate space. For example, such processes may offer a resolution of approximately +/−0.1 mm.

The 3D printed elongate member provides a scaffold for carrying a conductive layer on its surface. The precise geometric structure of this scaffold can be defined using a digital structural model. This digital structural model may be defined based on a numerical optimisation process, or based on an analytic system of equations.

As an example of an analytic system of equations, the path of the elongate member between its two ends 16, 18 (the connections to the two C-shaped members 20, 22 described above) may be defined thus:

$$x(t) = r \cdot \cos\left(\frac{t}{N}\right) + a \cdot \cos\left(\frac{t}{N}\right) \cdot \cos(t)$$

$$y(t) = r \cdot \sin\left(\frac{t}{N}\right) + a \cdot \cos\left(\frac{t}{N}\right) \cdot \sin(t)$$

$$z(t) = a \cdot \sin\left(\frac{t}{N}\right)$$

where $t \in [0, 2N\pi]$

In which m: maximum outer radius of the coil p: radius of conductor

N: numbers of turns
s: turn spacing (centre to centre of the conductor)
a: maximum distance of turns centres from central XY-plane (Z=0)

$$a = s \cdot \frac{\sin\left(\frac{\pi}{2} - \frac{\pi}{N}\right)}{\sin\left(\frac{2\pi}{N}\right)}$$

r: radius of coil turns $$r = m - p - a$$

This arrangement may provide a uniform spacing, along the length of the elongate member, between adjacent surfaces of the coil turns. For a given coil volume, it may also maximise the spacing (labelled 32 in FIG. 3 e.g. perpendicular distance of closest approach) between adjacent surfaces of the nearest coil turns 24, 26, 28, 30. The elongate member may be circular in cross section.

In one embodiment the following parameters are also used:
conductor diameter: 4.7625 mm
external coil diameter: 66 mm
connection pin diameter: 3 mm
connection pin gap: 30 mm
distance between coils axis and connection pin: 47 mm
copper thickness: 100 μm
minimum bending radius: 2.5*conductor radius
copper conductivity: 5.8e7 S/m[1]

Analytic systems of equations need not be used, a numerical model can be defined which aims to satisfy a series of constraints as defined by a merit function. For example, a merit function can be defined which, under a constraint of a particular maximum coil volume, selects the position of the elongate member based on increasing at least one of:
the uniformity in the spacing, along the length of the elongate member, between adjacent surfaces of the coil turns;
the spacing between adjacent surfaces of the nearest coil turns;
the number of coil turns;
the internal volume and/or area encircled by the coil; and
the conductance of the conductive tube formed by the layer of conductive material, which may be controlled by adjusting the thickness of the conductive layer (due to the skin effect at the operating frequency of the coil).

This latter parameter, the conductance, may depend upon the cross-section diameter of the elongate member, which may also be used as a parameter of the merit function. Other parameters may also be taken into account. Optimisation of merit functions like this may be performed by any suitable method, such as for example simulated annealing, Newton-Raphson methods, methods of conjugate gradient descent, and any other optimisation method. Examples of suitable approaches may be found, for example, Numerical Recipes in C++: The Art of Scientific Computing (Cambridge University Press, 1 Dec. 2007).

The analytic or numeric methods described above may be implemented using a suitably programmed processing apparatus, such as a programmable processor or a computer programmed with instructions to cause it to determine this digital structural model. However they are implemented, the output of both the analytic and numeric methods of defining the structure is a machine readable digital structural model which represents the desired coil structure in 3D space.

This three-dimensional model of the coil scaffold is supplied, in machine readable form, to a '3D printer' adapted to manufacture the scaffold. As alternatives to the methods already mentioned above, this may be by additive means such as extrusion deposition, Electron Beam Freeform Fabrication (EBF), granular materials binding, lamination, photopolymerization, or stereolithography or a combination thereof.

The machine readable model comprises a spatial map of the object to be printed, typically in the form of a Cartesian coordinate system defining the object's surfaces. This spatial map may comprise a computer file which may be provided in any one of a number of file conventions. One example of a file convention is a STL (StereoLithography) file which may be in the form of ASCII (American Standard Code for Information Interchange) or binary and specifies areas by way of triangulated surfaces with defined normals and vertices. An alternative file format is AMF (Additive Manufacturing File) which provides the facility to specify the material and texture of each surface as well as allowing for curved triangulated surfaces. The mapping of the coil may then be converted into instructions to be executed by 3D printer according to the printing method being used. This may comprise splitting the model into slices (for example, each slice corresponding to an x-y plane, with successive layers building the z dimension) and encoding each slice into a series of instructions. The instructions sent to the 3D printer may comprise Numerical Control (NC) or Computer NC (CNC) instructions, preferably in the form of G-code (also called RS-274), which comprises a series of instructions regarding how the 3D printer should act. The instructions vary depending on the type of 3D printer being used, but in the example of a moving printhead the instructions include: how the printhead should move, when/where to deposit material, the type of material to be deposited, and the flow rate of the deposited material.

The coils described herein may be embodied in one such machine readable model, for example a machine readable map or instructions, for example to enable a physical representation of said coil to be produced by 3D printing. This may be in the form of a software code mapping of the coil and/or instructions to be supplied to a 3D printer (for example numerical code) to provide one of the digital models described above.

Once an internal scaffold has been constructed, whether by one of the processes outlined above, or by some other method of additive or subtractive manufacture, the surface of the scaffold is coated by application of a layer of conductive material. For example, the conductive layer may be deposited on to the surface of the elongate member (e.g. by a plating or coating process such as sputtering).

The layer may be at least 50 μm thick. Examples of conductive material comprise copper, and high purity copper in particular. Other high conductivity materials may be used. For example the conductive layer may consist solely of a single metal such as copper or gold. Irrespective of the conductive material or materials which make it up, it may be arranged so that the material at the outer surface of the conductive layer has a conductivity which is at least as high as the bulk of the layer.

Whatever the material content of the layer it will thus be appreciated that this internal scaffold provides a support structure which may be wholly encapsulated by the conductive layer. This conductive layer conforms to and covers the surface of the elongate member. The result is a conductive tube formed in situ on the scaffold, which may be wholly encapsulated in the conductive layer—at least along the length of the coil turns. The scaffold rigidly supports this conductive tube in a position selected by the digital structural model (whether numerically or analytically defined) so that the spacing (distance of closest approach) between adjacent coil turns is uniform along the length of the coil. Of course, this spacing cannot be absolutely uniform, but for coils having a diameter on the order of a few tens of centimetres, a manufacturing tolerance of ±100 µm has been found to provide sufficient uniformity.

The conductive layer may comprise a different material from the scaffold, for example the scaffold may comprise a material having a lower conductivity than the conductive layer. In the example described above the scaffold comprises ABS plastic. ABS plastic is mentioned as one example of a material that can provide the scaffold. Other examples include PEEK, PVC, Acrylic and polyethene. Other plastics and other dielectric materials may be used.

Figure 5:
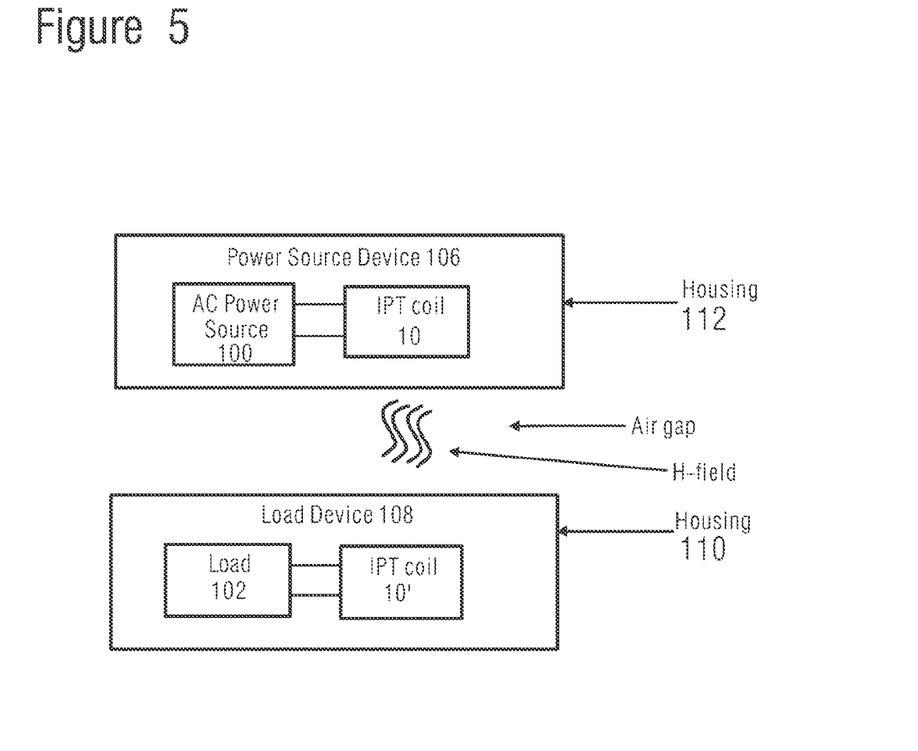
FIG. 5 shows a system comprising two devices arranged to transfer electrical power across an air gap between the devices.

FIG. 5 illustrates a system for providing inductive power transfer across an air gap from a power source device 106 to a load device 108.

The load device 108 comprises a load 102 to be provided with electrical power, and an inductive power transfer coil 10' according to the present disclosure. The coil 10' is generally arranged to receive electrical power by coupling with a time varying H-field. Such an H-field may vary with a frequency of a few MHz, for example less than 20 MHz, for example less than 10 MHz, for example more than 2 MHZ, for example between about 6 MHz and about 7 MHz, for example about 6.8 MHz. This may be the operating frequency of the coils of the present disclosure. The coil 10' may also be connected to the load 102 for providing received electrical power to that load 102.

The load 102 and the coil 10' may be enclosed in a housing 110, such as the type used to inhibit ingress of dust and moisture into electrical devices. The walls of the housing 110 may comprise low magnetic permeability material (such as plastic or some other dielectric) to permit inductive coupling through the housing. The IPT coil 10' may be aligned with a wall of the housing 110, that is to say the XY plane of the coil (see FIG. 1 and accompanying description) may be roughly parallel with this wall.

The power source device 106 comprises a source 100 of AC (alternating current) electrical power and another IPT coil 10. This IPT coil 10 too may be one such as that described above with reference to FIG. 1. The IPT coil 10 may be connected to the source 100 of AC electrical power to receive AC electrical current, and to provide based on that current a time varying H-field for the inductive transmission of power. As with the load device 108 the power source device 106 may comprise a similar housing 112, and the IPT coil 10 may be aligned with a wall of that housing 112.

In operation, the power source 100 can be operated to drive alternating current through the IPT coil 10 of the source device 106. This generates a time varying H-field which can transfer electrical power inductively through the wall of the housing 112 and across the air gap between the two devices. The IPT coil 101' of the load device can couple inductively with this H-field to drive AC current in the coil 10' and to provide AC current to the load 102.

It will be appreciated in the context of the present disclosure that the housing 110, 112, of one or both of the two devices may be omitted.

The features of any one of the coils described herein may be combined with any of the technically compatible apparatus described herein. Some features may be omitted or varied in structure. For example, rather than an elongate member which provides a solely internal scaffold the conductor may be embedded into a block or matrix of supporting material.

In some embodiments the internal coil scaffold has a first surface roughness, and the conductive layer has a second surface roughness, which is greater than the first surface roughness. In some embodiments however the conductive layer may be polished or otherwise have some surface finish applied to reduce its surface roughness. Other ways to achieve this may be used, accordingly, in some embodiments the surface roughness of the conductive layer may be less than that of the underlying scaffold.

The coil is generally self supporting, that is to say it has sufficient intrinsic rigidity to support its own weight. Typically, it circumscribes, or defines, a toroidal void in the spaces between the coil turns. Typically this void is empty, for example it comprises an air gap.

In some embodiments the elongate member is arranged in a helical form about the looped path, wherein the axis of the helical form is provided by the looped path, which may be circular. The pitch of the helical form is chosen so that each complete circuit of the elongate member around the looped path comprises less than one complete helix turn of the helical form thereby to provide a plurality of non-coplanar coil turns. One way to achieve this is for the coil to follow a spatial path which has the form:

$$x(t) = r \cdot \cos\left(\frac{t}{N}\right) + a \cdot \cos\left(\frac{t}{N}\right) \cdot \cos(t)$$

$$y(t) = r \cdot \sin\left(\frac{t}{N}\right) + a \cdot \cos\left(\frac{t}{N}\right) \cdot \sin(t)$$

$$z(t) = a \cdot \sin\left(\frac{t}{N}\right)$$

where, t is a discrete numeric variable $t \in [0, 2N\pi]$ and in which N is the number of coil turns, a is the maximum distance of the turn's centres from a central XY-plane (Z=0), and r is the radius of curvature of the outer coil turns.

In an aspect there is provided a method of manufacturing an inductive power transfer (IPT) coil, the method comprising: providing a coil scaffold comprising an elongate member arranged to provide at least a first coil turn and a second coil turn of a series of coil turns, wherein the second coil turn is successive to the first coil turn in the series of coil turns and the first coil turn and the second coil turn are non-coplanar with each other and wherein the first coil turn is at least partially surrounded, radially, by the second coil turn; providing a conductive layer which conforms to and covers the surface of the elongate member to provide a conductive tube which follows the form of the scaffold to provide the ITP coil, wherein: the coil scaffold supports the conductive tube so that there is a spacing between the first coil turn and the second coil turn; and, the distance of closest approach between the outer surfaces of the first coil turn and the second coil turn is uniform along the coil turns.

An aspect provides an inductive power transfer (IPT) coil comprising a coil scaffold comprising an elongate member disposed around and spaced from a looped path, wherein the elongate member is arranged in a helical form and the axis of the helical form is provided by the looped path so that the coil scaffold defines a toroidal void which contains the looped path, wherein each circuit of the looped path provides a coil turn; a conductive layer which conforms to and covers the surface of the elongate member to provide a coiled conductive tube, wherein the distance of closest approach between surfaces of adjacent successive coil turns is uniform along a coil turn. The pitch of the helical form may be chosen so that each circuit of the looped path provides a coil turn and each coil turn includes less than one complete helix turn of the helical form. The conductive layer may be continuous and unbroken. For example, the conductive layer may completely cover the coil turns of the elongate member.

It will be appreciated in the context of the present disclosure that, in these and other aspects described herein, each circuit of the looped path may provide a coil turn—e.g. each complete circuit of the elongate member about the looped path may provide a coil turn of the scaffold.

It will be appreciated in the context of the present disclosure that, in these and other aspects described herein, where two coil turns are non-coplanar, and the second of the two coil turns at least partially surrounds the first, this may be embodied by part of the first coil turn lying in a volume which is surrounded by the second coil turn. For example, a cylindrical volume may be circumscribed by the second coil turn when it is viewed in plan. That cylindrical volume may have an axial extent (e.g. in a direction perpendicular to the plane of that at plan view) defined by the axial extent of the second coil turn—e.g. from the lowest axial point of its lowest edge to the upper axial point on its upper edge.

Other examples and variations are contemplated within the scope of the appended claims.

The invention claimed is:

1. A method of manufacturing an inductive power transfer (IPT) coil, the method comprising:
providing a coil scaffold comprising an elongate member arranged in a helical form about a looped path with the looped path providing the axis of the helical form, wherein each circuit of the looped path by the elongate member provides a coil turn and wherein the coil scaffold comprises at least a first coil turn and a second coil turn of a series of coil turns, wherein the second coil turn is successive to the first coil turn in the series of coil turns, wherein the helical form has a pitch selected so that each coil turn of the elongate member comprises less than one complete helix turn of the elongate member, and wherein, for each coil turn, the start is radially offset from the end, thereby to provide the first coil turn and the second coil turn as being non-coplanar with each other and with the first coil turn is at least partially surrounded, radially, by the second coil turn; and
providing a conductive layer which conforms to and covers the surface of the elongate member to provide a conductive tube which follows the form of the scaffold to provide the coil;
wherein the coil scaffold supports the conductive tube so that there is a spacing between the first coil turn and the second coil turn.

2. The method of claim 1 comprising forming the conductive layer in situ on the scaffold, by depositing the conductive layer onto the scaffold.

3. The method of claim 1 wherein the conductive layer is continuous and unbroken around the coil turns, and wherein the conductive layer completely covers the coil turns.

4. The method of claim 1 wherein the conductive layer is at least 2.6 times as deep as the skin depth of electric field in the material at a central operating frequency of the coil, wherein the central frequency is 6.78 MHz and the conductive layer has a thickness of at least 100 μm.

5. The method of claim 1 wherein the tube has circular cross section.

6. The method of claim 1 wherein the coil scaffold has a first surface roughness, and the conductive layer has a second surface roughness, greater than the first surface roughness.

7. The method of claim 1 wherein the spacing is even around the turns.

8. The method of claim 7 wherein the spacing is even to within a tolerance selected based on at least one of:
a central operating frequency of the IPT coil;
a power rating of the IPT coil;
the spacing between adjacent coil turns;
the radius of curvature of the smallest coil turn; and
the radius of the conductive tube,
wherein the spacing is even to within 100 μm.

9. The method of claim 1 wherein the conductive layer comprises a different material from the scaffold, and wherein the scaffold comprises a material having a lower conductivity than the conductive layer.

10. An inductive power transfer (IPT) coil comprising
a coil scaffold comprising an elongate member arranged in a helical form about a looped path with the looped path providing the axis of the helical form, wherein each circuit of the looped path by the elongate member provides a coil turn and wherein the coil scaffold comprises at least a first coil turn and a second coil turn of a series of coil turns, wherein the second coil turn is successive to the first coil turn in the series of coil turns, wherein the helical form has a pitch selected so that each coil turn of the elongate member comprises less than one complete helix turn of the elongate member, and wherein, for each coil turn, the start is radially offset from the end, thereby to provide the first coil turn and the second coil turn as being non-coplanar with each other and with the first coil turn at least partially surrounded, radially, by the second coil turn; and
a conductive layer which conforms to and covers the surface of the elongate member to provide a coiled conductive tube.

11. The IPT coil of claim 10 wherein the coil scaffold supports the conductive layer so that, along the coil turns, there is an even spacing between the surface of the conductive layer of adjacent coil turns.

12. The IPT coil of claim 10 wherein the conductive layer is at least at least 2.6 times as deep as the skin depth of electric field in the material at a central operating frequency of the coil.

13. The IPT coil of claim 10 wherein the looped path comprises a circular path.

14. The IPT coil of claim 10 wherein the coil follows a spatial path which is defined thus:

$$x(t) = r \cdot \cos\left(\frac{t}{N}\right) + a \cdot \cos\left(\frac{t}{N}\right) \cdot \cos(t)$$

$$y(t) = r \cdot \sin\left(\frac{t}{N}\right) + a \cdot \cos\left(\frac{t}{N}\right) \cdot \sin(t)$$

$$z(t) = a \cdot \sin\left(\frac{t}{N}\right)$$

where, t is a discrete numeric variable $t \in [0, 2N\pi]$ and in which
- N is the number of coil turns, a is the maximum distance of the turn's centers from a central XY-plane (Z=0), and r is the radius of curvature of the outer coil turns.

15. The IPT coil of claim 10 wherein the minimum radius of curvature of the coil turns is at least twice, for example at least two and a half times the radius of the tube.

16. An apparatus comprising:
an IPT coil according to claim 10;
and one of:
- (a) a source of time varying electrical current connected to the IPT coil for generating a time varying H-field; and
- (b) an electrical load connected to be powered by the IPT coil when, in use, the IPT coil couples inductively with a time varying H-field to provide electrical current to the electrical load-,
wherein the IPT coil is arranged to couple inductively with an IPT coil of another similar apparatus for the transmission of electrical power across an air gap between the two IPT coils.

17. A tangible non-transitory storage medium storing a machine readable map or instructions configured to enable a physical representation of the IPT coil of claim 10 to be produced by 3D printing.

* * * * *